United States Patent
Okamoto

(10) Patent No.: US 12,528,458 B2
(45) Date of Patent: Jan. 20, 2026

(54) VEHICLE CONTROL APPARATUS

(71) Applicant: TOYOTA JIDOSHA KABUSHIKI KAISHA, Toyota (JP)

(72) Inventor: Kazuya Okamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 6 days.

(21) Appl. No.: 18/882,765

(22) Filed: Sep. 12, 2024

(65) Prior Publication Data

US 2025/0214572 A1 Jul. 3, 2025

(30) Foreign Application Priority Data

Dec. 28, 2023 (JP) ................. 2023-222909

(51) Int. Cl.
*B60W 30/09* (2012.01)
*B60W 50/14* (2020.01)

(52) U.S. Cl.
CPC ............ *B60W 30/09* (2013.01); *B60W 50/14* (2013.01); *B60W 2510/20* (2013.01); *B60W 2552/10* (2020.02); *B60W 2554/804* (2020.02); *B60W 2710/18* (2013.01)

(58) Field of Classification Search
CPC .. B60W 30/09; B60W 50/14; B60W 2510/20; B60W 2552/10; B60W 2554/804; B60W 2710/18; B60W 2520/10; B60W 30/0956; B60W 30/18163; B60W 30/12; B60W 2050/143; B60W 30/0953; B60W 40/09; B60W 50/0097; B60W 50/0098; B60W 2420/403; B60W 2420/408
See application file for complete search history.

(56) References Cited

U.S. PATENT DOCUMENTS

| | | | |
|---|---|---|---|
| 9,105,190 B2 | 8/2015 | Akiyama | |
| 9,393,960 B2* | 7/2016 | Kodaira | B60W 60/0053 |
| 9,483,945 B2 | 11/2016 | Okita et al. | |
| 9,873,412 B2 | 1/2018 | Moriizumi | |
| 10,793,147 B2* | 10/2020 | Kaminade | B60Q 9/008 |
| 2008/0065293 A1* | 3/2008 | Placke | B60W 50/14 |
| | | | 701/41 |
| 2012/0323403 A1* | 12/2012 | Okita | B60W 50/14 |
| | | | 701/1 |
| 2014/0032049 A1* | 1/2014 | Moshchuk | G08G 1/166 |
| | | | 701/42 |

(Continued)

FOREIGN PATENT DOCUMENTS

JP 2012-121534 A 6/2012

*Primary Examiner* — Sizo B Vilakazi
(74) *Attorney, Agent, or Firm* — SoraIP, Inc.

(57) ABSTRACT

A processor of a vehicle control apparatus is configured to, in a case where a second object is present within a predetermined range obliquely behind a subject vehicle in a second traveling lane adjacent to a first traveling lane, limit an override function in a case where a first condition is satisfied, a second condition is satisfied, and a third condition is satisfied. The first condition is for determining that a risk of contact between a first object and the subject vehicle is high. The second condition is for determining that the subject vehicle is undergoing a driving operation to move closer to the second traveling lane. The third condition is for determining that a risk of contact between the second object and the subject vehicle is high.

5 Claims, 4 Drawing Sheets

(56) References Cited

U.S. PATENT DOCUMENTS

| | | |
|---|---|---|
| 2021/0061309 A1* | 3/2021 | Kawanai ............... B60W 60/00 |
| 2021/0107521 A1 | 4/2021 | Fujita et al. |
| 2021/0107528 A1 | 4/2021 | Fujita et al. |
| 2021/0146956 A1 | 5/2021 | Fujita et al. |
| 2021/0146958 A1 | 5/2021 | Tanaka et al. |
| 2022/0234582 A1* | 7/2022 | Kim ..................... B62D 15/025 |
| 2025/0242801 A1* | 7/2025 | Shimanaka ....... B60W 30/0956 |

* cited by examiner

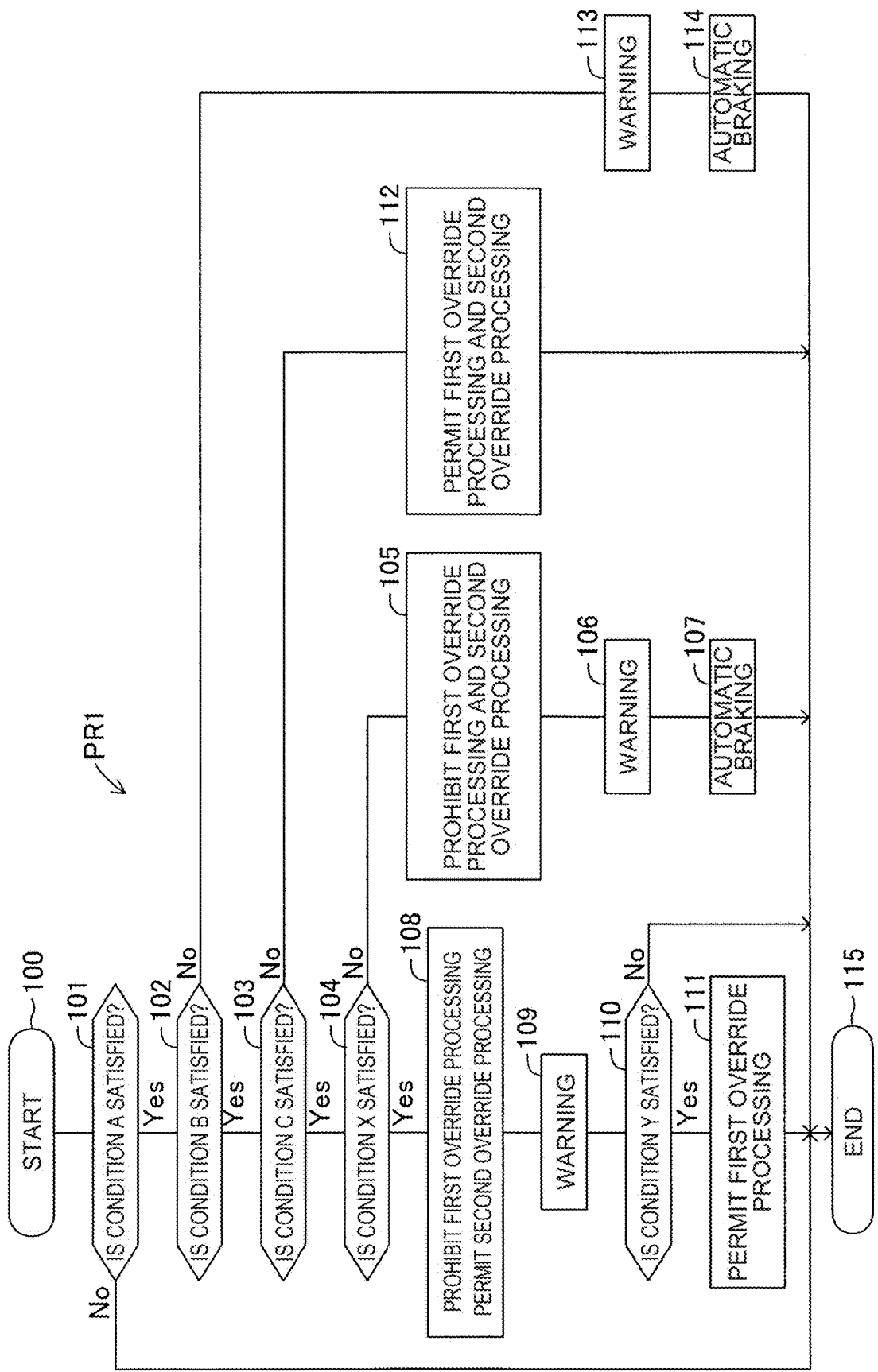

VEHICLE CONTROL APPARATUS

CROSS-REFERENCE TO RELATED APPLICATION

This application claims priority to Japanese Patent Application No. 2023-222909 filed on Dec. 28, 2023, incorporated herein by reference in its entirety.

BACKGROUND

1. Technical Field

The present disclosure relates to a vehicle control apparatus having a function of automatically controlling a predetermined device of a subject vehicle to reduce a risk of contact between the subject vehicle and an object located around the subject vehicle.

2. Description of Related Art

A vehicle control apparatus having a function (risk reduction function) of automatically controlling a predetermined device of a subject vehicle to reduce a risk of contact between the subject vehicle and an object located around the subject vehicle has been proposed (see, for example, Japanese Unexamined Patent Application Publication No. 2012-121534 (JP 2012-121534 A) below). The vehicle control apparatus (referred to be as a "conventional apparatus" below) in JP 2012-121534 A has, as the risk reduction function, a function (automatic braking function) of controlling a braking device to decelerate the subject vehicle in a case where a predetermined condition regarding a state in which the subject vehicle and an object located immediately ahead of the subject vehicle are approaching each other is satisfied. In addition, the conventional apparatus has a function (override function) of limiting the risk reduction function in a state in which a driver of the subject vehicle is executing a predetermined driving operation. For example, in a case where the driver is operating the steering wheel, the conventional apparatus does not execute the automatic braking.

SUMMARY

However, a subject vehicle approaches a preceding vehicle traveling immediately ahead of the subject vehicle in a first traveling lane in which the subject vehicle is traveling, and another vehicle traveling in the section obliquely behind the subject vehicle in a second traveling lane adjacent to the first traveling lane approaches the side of the subject vehicle in some cases. A possible scene in this situation is that a driver of the subject vehicle steers the subject vehicle to move the subject vehicle closer to the second traveling lane to avoid the preceding vehicle. When the driver forcibly moves the subject vehicle to the second traveling lane in this scene in spite of the presence of the vehicle approaching the subject vehicle from obliquely behind the subject vehicle in the second traveling lane, the driver of the subject vehicle may have less attention to the preceding vehicle than the attention of the driver to the other vehicle. Therefore, to reduce a risk of contact between the subject vehicle and the preceding vehicle, it is preferable to not limit the risk reduction function. The driver is, however, operating the steering wheel in this case and the risk reduction function is thus limited by the override function. That is, the automatic braking is not executed.

The present disclosure provides a vehicle control apparatus capable of reducing, in a situation in which a first object is present ahead of a subject vehicle and a second object is present obliquely behind the subject vehicle, a risk of contact between the subject vehicle and the first object in a scene in which the subject vehicle moves to the region ahead of the second object.

To solve the problem, a vehicle control apparatus (1) according to the present disclosure includes: an onboard sensor (20) configured to acquire information regarding a subject vehicle (V), information regarding a driver of the subject vehicle, and information regarding an object (V1, V2) located around the subject vehicle; and a processor (10) having a risk reduction function of executing risk reduction processing (P1, P2) of controlling the subject vehicle to reduce a risk of contact between a first object (V1) and the subject vehicle based on the information acquired from the onboard sensor and further having an override function of executing override processing (OR1, OR2) of limiting the risk reduction function in a case where the driver of the subject vehicle is executing a predetermined driving operation. The first object being located ahead of the subject vehicle in a first traveling lane (L1) in which the subject vehicle is traveling.

The processor is configured to, in a case where a second object (V2) is present within a predetermined range obliquely behind the subject vehicle in a second traveling lane (L2) adjacent to the first traveling lane, limit the override function in a case where a first condition (A) is satisfied, a second condition (B) is satisfied, and a third condition (C) is satisfied. The first condition is for determining that the risk of contact between the first object and the subject vehicle is high. The second condition is for determining that the subject vehicle is undergoing a driving operation to move closer to the second traveling lane. The third condition is for determining that a risk of contact between the second object and the subject vehicle is high.

The vehicle control apparatus according to the present disclosure automatically controls (risk reduction function) the subject vehicle to reduce the risk of contact between the first object located immediately ahead of the subject vehicle and the subject vehicle. In a case where the driver is intentionally executing the driving operation, the risk reduction function is limited by the override function. This eliminates the execution of the automatic control that the driver feels unnecessary. However, in a case where a driving operation (forcible lane change) of moving the subject vehicle closer to the second traveling lane (the region ahead of the second object) is executed in spite of the presence of the second object obliquely behind the subject vehicle in the second traveling lane (in a case where the first condition to the third condition are satisfied), the risk reduction function is not limited. The subject vehicle is thus controlled such that the risk of contact between the first object and the subject vehicle is reduced. This increases the safety of the subject vehicle.

In the vehicle control apparatus according to an aspect of the present disclosure, the first condition may include a condition regarding the distance (D1) and the relative velocity (vr1) between the subject vehicle and the first object, the second condition may include a condition regarding the steering angle of the subject vehicle, and the third condition may include a condition regarding the distance (D2) and the relative velocity (vs2) between the subject vehicle and the second object.

This allows the processor to relatively easily determine on the basis of information acquired by using well-known sensors such as a camera and a radar whether or not the first condition to the third condition are satisfied.

In the vehicle control apparatus according to another aspect of the present disclosure, the risk reduction processing may include first risk reduction processing (P1) and second risk reduction processing (P2) of respectively controlling a first device and a second device mounted on the subject vehicle, the override processing may include first override processing (OR1) and second override processing (OR2) of respectively limiting execution of the first risk reduction processing and the second risk reduction processing, and the processor may be configured to determine whether or not part of the subject vehicle is entering the second traveling lane and limit execution of any one or both of the first override processing and the second override processing depending on a result of the determination.

This makes it possible to limit part or the whole of the override function depending on the position of the subject vehicle in the transverse direction.

In the vehicle control apparatus according to another aspect of the present disclosure, the first risk reduction processing may be processing of controlling a notification device (30) serving as the first device such that a predetermined warning is issued to the driver of the subject vehicle, the second risk reduction processing may be processing of controlling a braking device (40) serving as the second device such that the subject vehicle is braked, and the processor may be configured to limit the first override processing in a case where the part of the subject vehicle is entering the second traveling lane, and limit the first override processing and the second override processing in a case where the subject vehicle is not entering the second traveling lane.

If the subject vehicle is automatically braked in a case where the part of the subject vehicle is entering the second traveling lane, a risk of contact between the subject vehicle and the first object is reduced, but a risk of contact between the subject vehicle and the second object may increase. The vehicle control apparatus according to this aspect does not limit the execution of the warning, but limits the execution of the automatic braking in a case where the part of the subject vehicle is entering the second traveling lane through a driving operation that is manually made. The execution of the warning reduces a risk of contact between the subject vehicle and the first object. The execution of the automatic braking is limited and an increase in a risk of contact between the subject vehicle and the second object is therefore reduced. Meanwhile, even if the automatic braking is executed in a case where the whole of the subject vehicle is located in the first traveling lane, a risk of contact between the subject vehicle and the second object does not considerably increase. The vehicle control apparatus according to this aspect prevents the execution of the warning and the automatic braking from being limited even if the driver is executing a predetermined driving operation in a case where the whole of the subject vehicle is located in the first traveling lane. This reduces a risk of contact between the subject vehicle and the first object.

In the vehicle control apparatus according to another aspect of the present disclosure, the onboard sensor may include a sensor (25) that acquires information regarding the direction of the line of sight of the driver of the subject vehicle, and the processor may be configured to limit the override function in a case where the first condition to the third condition are satisfied and a fourth condition is satisfied. The fourth condition is for determining that the driver of the subject vehicle is casting a line of sight to the second traveling lane.

This reduces a risk of contact between the subject vehicle and the first object by the risk reduction function when a driver has less attention to the first object.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a flowchart of a program that is executed by a CPU to implement a risk reduction function.

DETAILED DESCRIPTION OF EMBODIMENTS

Overview

Figure 1:
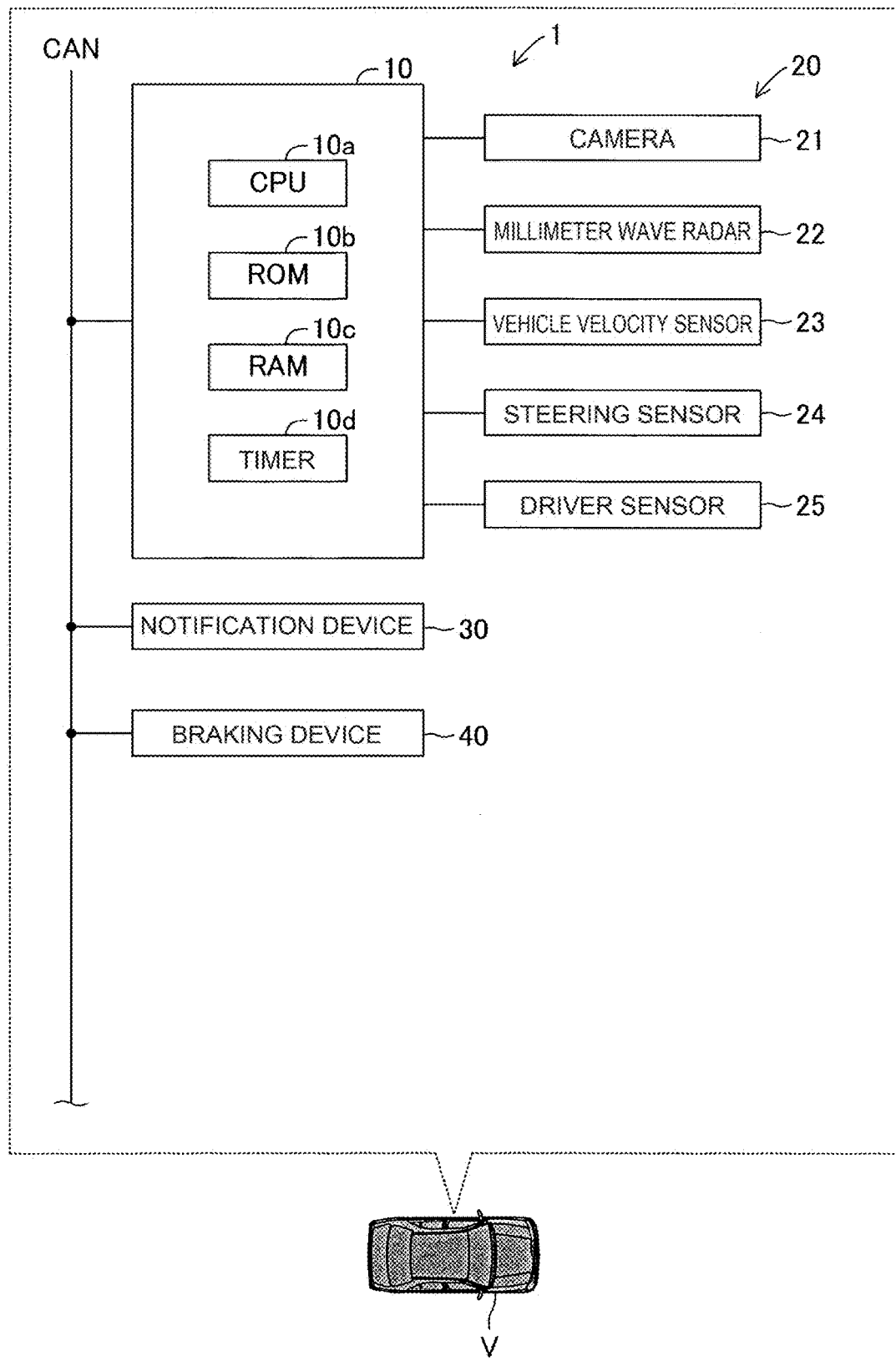
FIG. 1 is a block diagram of a vehicle control apparatus according to an embodiment of the present disclosure.

As illustrated in FIG. 1, a vehicle control apparatus 1 according to an embodiment of the present disclosure is applied to a vehicle V (referred to as a "subject vehicle" below) having an autonomous driving function. The vehicle control apparatus 1 has a risk reduction function of executing risk reduction processing of controlling the subject vehicle (a notification device 30 and a braking device 40) to reduce a risk of contact between the subject vehicle and an object located around the subject vehicle in a state in which the autonomous driving function is disabled.

Specific Configuration

As illustrated in FIG. 1, the vehicle control apparatus 1 includes an ECU 10, an onboard sensor 20, the notification device 30, and the braking device 40.

The ECU 10 includes a microcomputer including a CPU 10a, a ROM 10b (rewritable nonvolatile memory), a RAM 10c, a timer 10d, and the like. The CPU implements a variety of functions by executing a program (instruction) stored in the ROM. The ECU 10 is connected to another ECU through a controller area network (CAN).

The onboard sensor 20 includes an object detection sensor DS that detects objects located ahead of and obliquely behind the subject vehicle. The object detection sensor DS includes a camera 21 and a millimeter wave radar 22.

The camera 21 includes a plurality of imaging devices. Each of the imaging devices incorporates, for example, a CCD. For example, the respective imaging devices are installed at the front and the rear of the subject vehicle and these imaging devices face the regions ahead of and behind the subject vehicle. The respective imaging devices capture images of the front region and the rear region (obliquely rear region) of the subject vehicle at a predetermined frame rate to acquire image data. The camera 21 further includes an image analysis device. The image analysis device acquires image data from each of the imaging devices, analyzes the image data, and recognizes (identifies) a target present at the angle of field. The image analysis device recognizes, for example, a lane marking (a lane line of a traveling lane). In addition, the image analysis device recognizes, for example, a preceding vehicle V1 located in the section immediately ahead of the subject vehicle. In addition, the image analysis device recognizes, for example, another vehicle V2 located in the section obliquely behind the subject vehicle in a traveling lane L2 adjacent to a traveling lane L1 in which the subject vehicle is traveling. The image analysis device provides a result of the recognition (a result of the identification of the target) to the ECU 10.

The millimeter wave radar 22 includes a plurality of transmission-reception units. For example, the respective transmission-reception units are installed at the front and the rear of the subject vehicle. The respective transmission-reception units emit radio waves (referred to as "millimeter waves" below) in the millimeter wave band to the regions ahead of and behind (the right region and the left region behind) the subject vehicle and receive the millimeter waves (reflection waves) reflected by three-dimensional objects (e.g., the preceding vehicle V1 and the other vehicle V2) located in the regions. The millimeter wave radar 22 further includes a signal processing unit. The signal processing unit acquires various kinds of information regarding the respective reflection points of millimeter waves on the basis of a physical quantity such as the time from the emission of the millimeter waves to the reception of the reflection waves by each of the transmission-reception units, the attenuation level of the reflection waves, or the difference between the frequency of the emitted millimeter waves and the frequency of the received reflection waves. For example, the signal processing unit calculates the position (the position (the direction and the distance) relative to the transmission-reception unit) of each of the reflection points. In addition, the signal processing unit calculates the velocity (the rate of change in the distance between the subject vehicle and each reflection point) of each reflection point relative to the subject vehicle. Results of the calculation (data (data including the positions and the velocities for the respective reflection points) indicating the distribution of the respective reflection points) are then provided to the ECU 10.

It is possible for the ECU 10 to acquire information (such as the position (the direction and the distance) about an object relative to the subject vehicle or the velocity (relative velocity) of an object relative to the subject vehicle) regarding an object present in the field of vision (detectable region) of the object detection sensor DS on the basis of fusion information in which information acquired from the camera 21 and information acquired from the millimeter wave radar 22 are integrated.

The onboard sensor 20 further includes a vehicle velocity sensor 23. The vehicle velocity sensor 23 acquires velocity vs (the forward movement velocity (absolute value) relative to the traveling lane L1) of the subject vehicle on the basis of the rotation speed of a wheel per unit time. The vehicle velocity sensor 23 then provides the acquired velocity vs to the ECU 10. It is possible for the ECU 10 to acquire the velocity (the velocity relative to the road surface) of the object on the basis of the information (the relative velocity (the rate of change in the distance between the subject vehicle and the object)) acquired from the object detection sensor DS and the information (velocity vs) acquired from the vehicle velocity sensor 23. For example, it is possible for the ECU 10 to acquire velocity vs1 of the preceding vehicle V1 and velocity vs2 of the other vehicle V2.

The onboard sensor 20 further includes a steering sensor 24. The steering sensor 24 detects a rotation angle θ (rotation angle position) of the steering wheel from the neutral position. In a case where the steering wheel is at the neutral position, the rotation angle θ is "0°". When the steering wheel is rotated clockwise, the rotation angle θ increases. In contrast, when the steering wheel is rotated counterclockwise, the rotation angle θ decreases. The steering sensor 24 provides the rotation angle θ to the ECU 10.

The onboard sensor 20 further includes a driver sensor 25. The driver sensor 25 includes an in-vehicle camera. The in-vehicle camera includes an imaging device and an image analysis device similar to those of the camera 21. The imaging device is installed on the dashboard of the subject vehicle. The imaging device captures images of the face of a driver of the subject vehicle at a predetermined frame rate to acquire image data. The image analysis device analyzes the image data acquired from the imaging device, calculates the direction of the driver's line of sight on the basis of the image, and provides a result of the calculation to the ECU 10.

The notification device 30 includes an image display device and an audio device. The image display device is disposed, for example, in the instrument panel (near the velocity display device). The image display device displays an image in accordance with a command acquired from the ECU 10. The audio device reproduces sound in accordance with a command acquired from the ECU 10.

The braking device 40 applies braking force to a wheel. The braking device 40 includes a brake ECU, a hydraulic circuit, and a brake caliper. The hydraulic circuit includes a reservoir, an oil pump, a variety of valve devices, an oil pressure sensor, and the like that are not illustrated. The brake caliper is a hydraulic actuator including a cylinder and a piston. The cylinder is supplied with oil and the oil pressure in the cylinder increases. This pushes out the piston from the cylinder. The tip of the piston is provided with a brake pad. This brake pad is pushed against the brake disc. The brake ECU acquires a target value of braking force from the ECU 10. The brake ECU controls the hydraulic circuit to cause braking force applied to a wheel to coincide with the target value.

Risk Reduction Function

In a case where the following condition A (a first condition of the present disclosure) is satisfied, a risk of contact between the subject vehicle and the preceding vehicle V1 is considered to be high in the present embodiment.

[Condition A] Predicted Time TTC1 Elapsed Before the Subject Vehicle Comes into Contact with the Preceding Vehicle V1 is Less than or Equal to a Threshold TTC1th.

The ECU 10 acquires the predicted time TTC1 as described below. In a case where the ignition switch is in an on-state, the ECU 10 acquires various kinds of information from the onboard sensor 20 in a predetermined cycle and acquires, on the basis of the information, the predicted time TTC1 elapsed before the subject vehicle and the preceding vehicle V1 come into contact with each other. Specifically, the ECU 10 determines on the basis of information acquired from the camera 21 and the millimeter wave radar 22 whether or not the preceding vehicle V1 is present ahead of the subject vehicle. In a case where the ECU 10 determines that the preceding vehicle V1 is present ahead of the subject vehicle, the ECU 10 acquires distance D1 and relative velocity vr1 (=vs-vs1) between the subject vehicle and the preceding vehicle V1 on the basis of the information acquired from the camera 21 and the millimeter wave radar 22. The ECU 10 then acquires the value obtained by dividing the distance D1 by the relative velocity vr1 as the predicted time TTC1 (=D1/vr1). In a case where the time TTC1 is less than or equal to the threshold TTC1th, the ECU 10 executes the following warning processing P1 and automatic braking processing P2 as the risk reduction processing to reduce a risk of contact between the subject vehicle and the preceding vehicle V1.

Warning Processing P1

The ECU 10 transmits a predetermined warning command to the notification device 30 to prompt a driver to start an evasive action for avoiding contact between the subject vehicle and the preceding vehicle V1. The image display device of the notification device 30 displays an image (icon) corresponding to the warning command. In addition, the audio device of the notification device 30 reproduces sound (the sound of the beep) corresponding to the warning command.

Automatic Braking Processing P2

The ECU 10 decides a target value F of braking force on the basis of the time TTC1. Here, the ROM 10b stores a map M1 that defines the relationship between the time TTC1 and the target value F of braking force. The ECU 10 decides the target value F with reference to the map M1. It is to be noted that the map M1 is designed such that a target value Fa of braking force corresponding to time TTC1a is larger than a target value Fb corresponding to time TTC1b longer than the time TTC1a. The ECU 10 transmits the decided target value F to the brake ECU as a braking command.

Override Processing OR

In a case where the time TTC1 is less than or equal to the threshold TTC1th, the ECU 10 executes the warning processing P1 and the automatic braking processing P2 as described above in principle. However, in a case where a driver is intentionally executing a driving operation, the driving operation (the intention of the driver) of the driver may be prioritized and the subject vehicle may operate according to the driving operation. That is, it is preferable to limit the risk reduction function in this case. Accordingly, in a case where a driver is intentionally executing a driving operation, the execution of the warning processing P1 and/or the automatic braking processing P2 by the ECU 10 is prohibited (limited). This processing will be referred to as "override processing OR". In a case where the following condition B (a second condition of the present disclosure) is satisfied, the driver is considered to be intentionally executing a driving operation in the present embodiment.

[Condition B] the Absolute Value of the Rotation Angle θ to the Traveling Lane L2 Exceeds a Threshold θTh.

The ECU 10 sequentially acquires the rotation angle θ from the steering sensor 24. In a case where the absolute value of the rotation angle θ exceeds the threshold θth, the ECU 10 executes first override processing OR1 of prohibiting the execution of the warning processing P1 and second override processing OR2 of prohibiting the execution of the automatic braking processing P2. It is to be noted that, in a case where the rotation angle θ exceeds the threshold eth while the ECU 10 is executing the warning processing P1 and the automatic braking processing P2, the ECU 10 suspends the warning processing P1 and the automatic braking processing P2. The processing of suspending the warning processing P1 is included in the first override processing OR1 and the processing of suspending the automatic braking processing P2 is included in the second override processing OR2.

Figure 2:
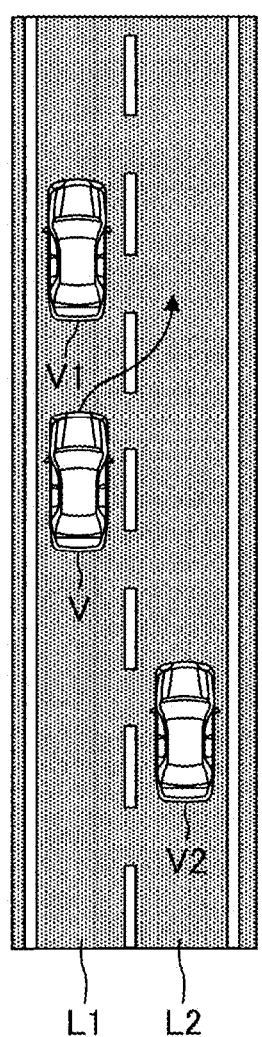
FIG. 2 is a plan view of a first situation.
Figure 3:
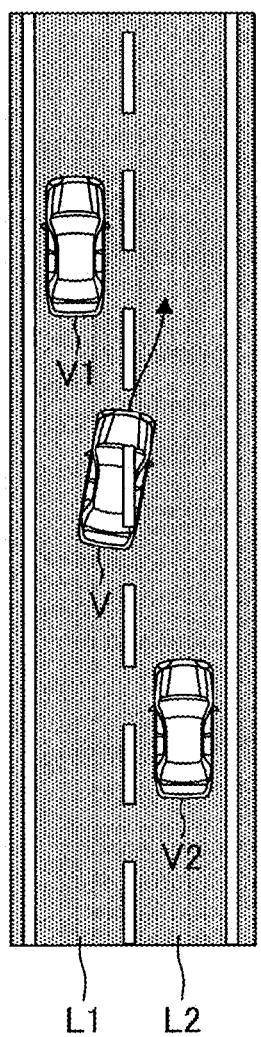
FIG. 3 is a plan view of a second situation.

However, as illustrated in FIGS. 2 and 3, the subject vehicle approaches the preceding vehicle V1 traveling immediately ahead of the subject vehicle in the traveling lane L1, and the other vehicle V2 traveling in the section obliquely behind the subject vehicle in the traveling lane L2 approaches the side of the subject vehicle in some cases. A possible scene (a scene in which a lane change is made) in this situation is that a driver of the subject vehicle steers the subject vehicle to move the subject vehicle closer to the traveling lane L2 to avoid the preceding vehicle V1. When the driver forcibly moves the subject vehicle to the traveling lane L2 in this way in spite of the presence of the other vehicle V2 approaching the subject vehicle from obliquely behind the subject vehicle in the traveling lane L2, the driver of the subject vehicle may have less attention to the preceding vehicle V1 than the attention of the driver to the other vehicle V2. In this case, a risk of contact between the subject vehicle and the preceding vehicle V1 may increase. Thus, it is preferable to not execute the override processing OR in this case. That is, it is preferable to not limit the risk reduction function even in a case where it is determined that a driver is intentionally executing a driving operation (in a case where the condition B is satisfied).

Accordingly, in a case where the condition A and the condition B are satisfied, the ECU 10 determines whether or not a predetermined condition described below is satisfied and decides whether or not to permit the execution of the first override processing and/or the second override processing depending on a result of the determination.

The ECU 10 first determines whether or not a condition C (a third condition of the present disclosure) regarding a risk of contact between the subject vehicle and the other vehicle V2 is satisfied.

[Condition C] Predicted Time TTC2 Elapsed Before the Subject Vehicle and the Other Vehicle V2 Come into Contact with Each Other is Less than or Equal to a Threshold TTC2th.

It is to be noted that the ECU 10 acquires the value obtained by dividing distance D2 between the subject vehicle and the other vehicle V2 by relative velocity vr2 as the predicted time TTC2.

Here, in a case where the subject vehicle undergoes automatic braking in a state in which part of the subject vehicle is entering the traveling lane L2, a risk of contact between the subject vehicle and the other vehicle V2 may increase. Accordingly, in a case where the ECU 10 determines that the condition A to the condition C are satisfied, the ECU 10 determines whether or not the following condition X regarding the position (the position in the width direction of the road) of the subject vehicle in the transverse direction is satisfied.

[Condition X] Part of the Subject Vehicle is Entering the Traveling Lane L2.

In a first situation (see FIG. 2) in which the condition A to the condition C are satisfied and the condition X is not satisfied, the execution of the first override processing and the second override processing is prohibited. That is, in the first situation, the ECU 10 executes the warning processing P1 and the automatic braking processing P2 in spite of the rotation angle θ exceeding the threshold θth (the second condition being satisfied).

Meanwhile, in a second situation (see FIG. 3) in which the condition A to the condition C are satisfied and the condition X is satisfied, the execution of the first override processing is permitted and the execution of the second override processing is prohibited. That is, in the second situation, the ECU 10 executes the warning processing P1 in spite of the rotation angle θ exceeding the threshold eth. Meanwhile, the ECU 10 does not execute the automatic braking processing P2 in the second situation.

In a case where, after the attention of a driver to the preceding vehicle V1 is increased as described above by the execution of the warning processing P1 in the second situation, the warning processing P1 continues, the driver may feel the warning annoying (the driver may feel more uncomfortable). Accordingly, the ECU 10 sequentially determines from the time of the start of the warning processing P1 in the second situation whether or not the following condition Y regarding the driver's line of sight is satisfied in the period in which the warning processing P1 is being executed.

[Condition Y] the Driver is Casting a Line of Sight to the Preceding Vehicle V1.

It is to be noted that the ECU 10 acquires a direction a of the preceding vehicle V1 relative to the traveling direction of the subject vehicle on the basis of information acquired from the object detection sensor DS and further acquires a direction B of the driver's line of sight relative to the traveling direction of the subject vehicle from the driver sensor 25. In a case where the difference between the direction a and the direction B (the angle between both the direction a and the direction B) is less than or equal to a threshold, the ECU 10 determines that the driver is casting a line of sight to the preceding vehicle V1 (the condition Y is satisfied). In a case where the condition Y is satisfied, the execution of the first override processing is permitted. That is, in this case, the ECU 10 suspends the execution of the warning processing P1.

Next, a program PR1 to be executed by the CPU 10a (referred to simply as the "CPU" below) of the ECU 10 to implement the risk reduction function will be described with reference to FIG. 4.

The CPU starts the execution of the program PR1 in a predetermined cycle in a case where the ignition switch is in an on-state. The CPU starts the execution of the program PR1 in step 100 and advances the processing to step 101.

The CPU determines in step 101 whether or not the condition A (TTC1≤TTC1th) is satisfied. In a case where the CPU determines that the condition A is satisfied (101: Yes), the CPU advances the processing to step 102. In contrast, in a case where the CPU does not determine that the condition A is satisfied (101: No), the CPU advances the processing to step 115 described below and ends the execution of the program PR1 in step 115.

The CPU determines in step 102 whether or not the condition B (|θ|>θth) is satisfied. In a case where the CPU determines that the condition B is satisfied (102: Yes), the CPU advances the processing to step 103. In contrast, in a case where the CPU does not determine that the condition B is satisfied (102: No), the CPU advances the processing to step 113 described below.

The CPU determines in step 103 whether or not the condition C (TTC2≤TTC2th) is satisfied. In a case where the CPU determines that the condition C is satisfied (103: Yes), the CPU advances the processing to step 104. In contrast, in a case where the CPU does not determine that the condition C is satisfied (103: No), the CPU advances the processing to step 112 described below.

The CPU determines in step 104 whether or not the condition X is satisfied. In a case where the CPU does not determine that the condition X is satisfied (104: No), the CPU advances the processing to step 105. In contrast, in a case where the CPU determines that the condition X is satisfied (104: Yes), the CPU advances the processing to step 108 described below.

The situation in which the CPU advances the processing from step 104 to step 105 corresponds to the first situation. In this case, the CPU enters, in step 105, a state in which the execution of the first override processing OR1 and the second override processing OR2 is prohibited. The CPU advances the processing to step 106 in the state set as described above.

The CPU executes the warning processing P1 in step 106. Subsequently, the CPU advances the processing to step 107.

The CPU executes the automatic braking processing P2 in step 107. Subsequently, the CPU advances the processing to step 115 and ends the execution of the program PR1 in step 115.

The situation in which the CPU advances the processing from step 104 to step 108 corresponds to the second situation. In this case, the CPU enters, in step 108, a state in which the execution of the first override processing OR1 is prohibited and the execution of the second override processing OR2 is permitted. The CPU advances the processing to step 109 in the state set as described above.

The CPU executes the warning processing P1 in step 109. It is to be noted that the CPU executes the second override processing OR2 in this case. That is, the automatic braking processing P2 is not executed. Subsequently, the CPU advances the processing to step 110.

The CPU determines in step 110 whether or not the condition Y is satisfied. In a case where the CPU determines that the condition Y is satisfied (110: Yes), the CPU advances the processing to step 111. In contrast, in a case where the CPU does not determine that the condition Y is satisfied (110: No), the CPU advances the processing to step 115 and ends the execution of the program PR1 in step 115.

In a case where the CPU advances the processing to step 111, the CPU enters a state in which the execution of the first override processing OR1 is permitted. In a case where the warning is executed by the notification device 30 when the CPU executes step 111, the CPU therefore ends (suspends) the warning. Subsequently, the CPU advances the processing to step 115 and ends the execution of the program PR1 in step 115.

The situation (TTC2>TTC2th) in which the CPU advances the processing from step 103 to step 112 is a situation in which it is possible to make a lane change to the traveling lane L2 with a relatively plenty of time to spare. In this case, the CPU enters, in step 112, a state in which the execution of the first override processing OR1 and the second override processing OR2 is permitted. That is, the CPU advances the processing to step 115 without executing the warning processing P1 and the automatic braking processing P2 and ends the execution of the program PR1 in step 115.

In addition, in a case where the CPU does not determine in step 102 that the condition B is satisfied (102: No), the CPU executes the warning processing P1 in step 113 and then executes the automatic braking processing P2 in step 114. Subsequently, the CPU advances the processing to step 115 and ends the execution of the program PR1 in step 115.

Advantageous Effect

The vehicle control apparatus 1 executes the warning processing P1 and the automatic braking processing P2 to reduce a risk of contact between the preceding vehicle V1 located immediately ahead of the subject vehicle and the subject vehicle (risk reduction function). In a case where a driver is intentionally executing a driving operation, the risk reduction function is limited by the override function. This eliminates the execution of the automatic control that the driver feels unnecessary. However, in a case where a driving operation (forcible lane change) of moving the subject vehicle closer to the traveling lane L2 (the region ahead of the other vehicle V2) is executed in spite of the presence of the other vehicle V2 obliquely behind the subject vehicle in the traveling lane L2, the risk reduction function is not limited. That is, the subject vehicle is controlled such that a risk of contact between the preceding vehicle V1 and the subject vehicle is reduced. This increases the safety of the subject vehicle.

The present disclosure is not limited to the embodiment. As described below, it is possible to adopt a variety of modification examples within the scope of the present disclosure.

FIRST MODIFICATION EXAMPLE

In a case where the condition A to the condition C are satisfied, the ECU 10 limits the override function in the embodiment (step 105 or step 108). Instead, the ECU 10 may be configured to limit the override function in a case where the condition A to the condition C are satisfied and the following condition D (a fourth condition of the present disclosure) is satisfied.
[Condition D] the Driver is Casting a Line of Sight to the Traveling Lane L2 (or the Side Mirror Closer to the Traveling Lane L2).

Specifically, in a case where the condition C is satisfied in step 103 of the program PR1 (103: Yes), the CPU advances the processing to step S (unillustrated) of determining whether or not the condition D is satisfied. In a case where the CPU determines that the condition D is satisfied (S: Yes), the CPU advances the processing to step 104. In contrast, in a case where the CPU does not determine that the condition D is satisfied (S: No), the CPU advances the processing to step 112.

SECOND MODIFICATION EXAMPLE

In a case where the absolute value of the rotation angle θ exceeds the threshold θth, the ECU 10 determines that the condition B is satisfied in the embodiment. Instead, the ECU 10 may determine that the condition B is satisfied in a case where the absolute value of the rotation angle θ exceeds the threshold θth and the direction indicator lamp of the subject vehicle closer to the traveling lane L2 is in operation.

What is claimed is:

1. A vehicle control apparatus comprising:
an onboard sensor configured to acquire information regarding a subject vehicle, information regarding a driver of the subject vehicle, and information regarding an object located around the subject vehicle; and
a processor having a risk reduction function of executing risk reduction processing of controlling the subject vehicle to reduce a risk of contact between a first object and the subject vehicle based on the information acquired from the onboard sensor and further having an override function of executing override processing of limiting the risk reduction function in a case where the driver of the subject vehicle is executing a predetermined driving operation, the first object being located ahead of the subject vehicle in a first traveling lane in which the subject vehicle is traveling, wherein
the processor is configured to, in a case where a second object is present within a predetermined range obliquely behind the subject vehicle in a second traveling lane adjacent to the first traveling lane, limit the override function in a case where a first condition is satisfied, a second condition is satisfied, and a third condition is satisfied,
the first condition being for determining that the risk of contact between the first object and the subject vehicle is high,
the second condition being for determining that the subject vehicle is undergoing a driving operation to move closer to the second traveling lane,
the third condition being for determining that a risk of contact between the second object and the subject vehicle is high.

2. The vehicle control apparatus according to claim 1, wherein
the first condition includes a condition regarding distance and relative velocity between the subject vehicle and the first object,
the second condition includes a condition regarding a steering angle of the subject vehicle, and
the third condition includes a condition regarding distance and relative velocity between the subject vehicle and the second object.

3. The vehicle control apparatus according to claim 1, wherein
the risk reduction processing includes first risk reduction processing and second risk reduction processing of respectively controlling a first device and a second device mounted on the subject vehicle,
the override processing includes first override processing and second override processing of respectively limiting execution of the first risk reduction processing and the second risk reduction processing, and
the processor is configured to determine whether or not part of the subject vehicle is entering the second traveling lane and limit execution of any one or both of the first override processing and the second override processing depending on a result of the determination.

4. The vehicle control apparatus according to claim 3, wherein
the first risk reduction processing is processing of controlling a notification device serving as the first device such that a predetermined warning is issued to the driver of the subject vehicle,
the second risk reduction processing is processing of controlling a braking device serving as the second device such that the subject vehicle is braked, and
the processor is configured to limit the first override processing in a case where the part of the subject vehicle is entering the second traveling lane, and limit the first override processing and the second override processing in a case where the subject vehicle is not entering the second traveling lane.

5. The vehicle control apparatus according to claim 1, wherein
the onboard sensor includes a sensor that acquires information regarding a direction of a line of sight of the driver of the subject vehicle, and
the processor is configured to limit the override function in a case where the first condition to the third condition are satisfied and a fourth condition is satisfied, the fourth condition being for determining that the driver of the subject vehicle is casting a line of sight to the second traveling lane.

* * * * *